Dec. 6, 1949 P. J. YARMAN 2,490,186
BICYCLE PACKAGE
Filed May 28, 1947 2 Sheets-Sheet 1
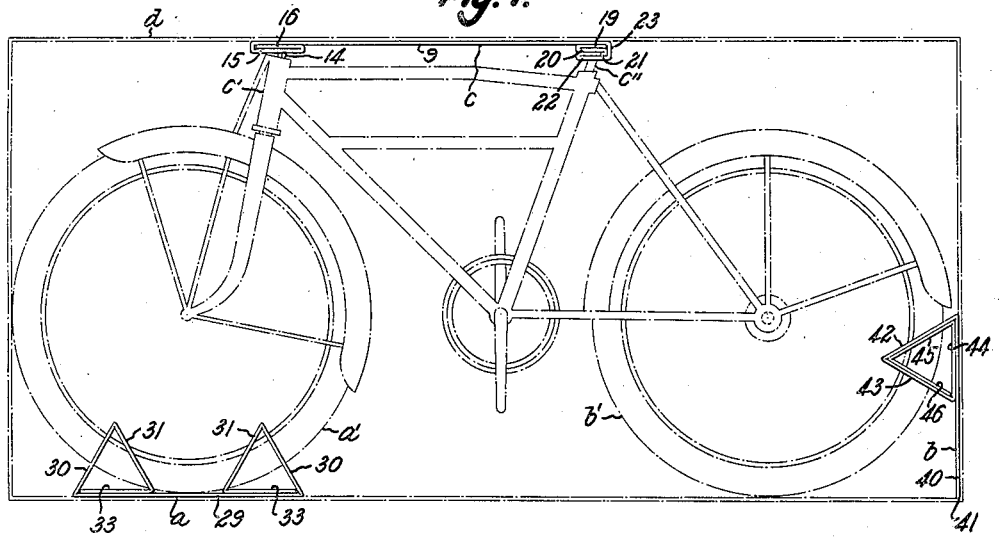
Inventor
Paul J. Yarman
by
W. W. Finckel Jr.
Attorney Dec. 6, 1949     P. J. YARMAN     2,490,186
BICYCLE PACKAGE Filed May 28, 1947     2 Sheets-Sheet 2

Inventor
Paul J. Yarman
By
W. F. Finckel Jr.
Attorney

Patented Dec. 6, 1949

2,490,186

UNITED STATES PATENT OFFICE 2,490,186

BICYCLE PACKAGE

Paul J. Yarman, Barberton, Ohio, assignor to The Ohio Boxboard Company, Rittman, Ohio, a corporation of Ohio Application May 28, 1947, Serial No. 751,045

4 Claims. (Cl. 206—46)

This invention relates to the packaging of bicycles for shipment, and it has special reference to the provision of means for securely supporting a bicycle in a shipping container in such a manner that it cannot shift therein and will be guarded against rubbing contact with the walls of the container, thus insuring against injury of the mechanism of the bicycle and marring of its finish during transportation and handling.

One object of the invention is to provide spacing and blocking members for locating the bicycle in the container in the manner and for the purpose hereinbefore explained, such members being fabricated from paperboard material, preferably corrugated board, and being so designed and constructed as to require for their formation a minimum amount of such material and only the simplest of assembly operations, thereby affording an economy in production cost and a resulting low cost to the packer.

Another object of the invention is to provide spacing and blocking members which may be easily and quickly applied relatively to the bicycle and container during the packaging operation, and so designed as to readily apprise the packer of their intended functional location within the container and with respect to certain selected cooperating parts of the bicycle.

The spacing and blocking members of the invention preferably include a cradle member for engagement with one wheel of the bicycle, preferably the front wheel, a longitudinal stop member for engagement with the other wheel, preferably the rear wheel, and a frame engaging member formed and adapted for predetermined location with respect to the handle bar post and seat post of the bicycle frame, and it will be understood that these members not only intimately and, preferably, immovably engage the parts of the bicycle with which they are associated but also bear against the container walls adjacent to them in such a manner as to preclude movement of the bicycle within the container. Moreover, due to the somewhat yieldable and springy nature of the paperboard material of which they are made, preferably corrugated board, as hereinbefore mentioned, their support of the bicycle within the container will be of a somewhat resilient character capable of absorbing shocks incident to transportation and handling, as will be explained more fully hereinafter and finally claimed.

Figure 6:
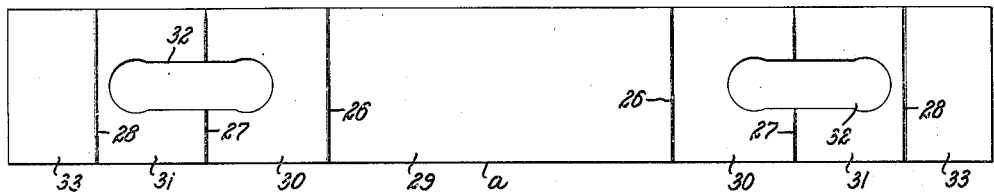
Figure 7:
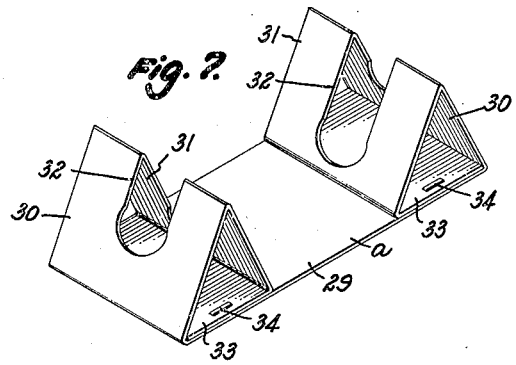
Figure 8:
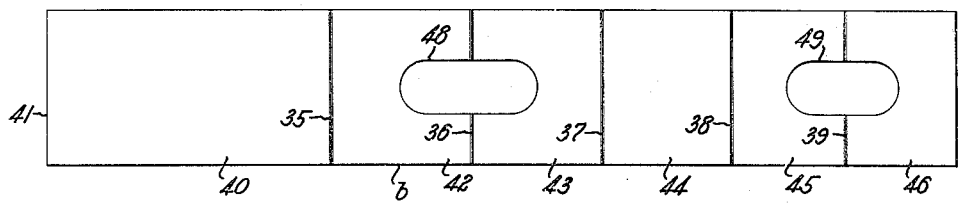
Figure 9:
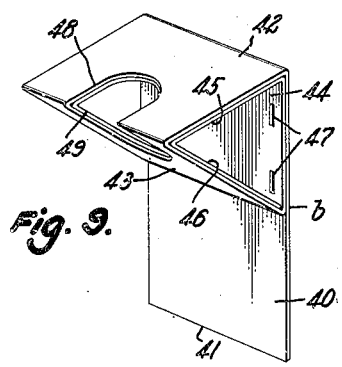

In the accompanying drawings illustrating the invention, in the several figures of which like parts are similarly designated, Fig. 1 is a schematic side view illustrating the preferred application and arrangement of the spacing and blocking members of the invention to a packaged bicycle, the container and the bicycle being indicated in broken lines, Fig. 2 is a plan view of the paperboard blank from which the frame engaging member of the invention is formed, Fig. 3 and Fig. 4 are, respectively, a top plan view and a bottom plan view of the completed frame engaging member, Fig. 5 is a central longitudinal section of the frame engaging member of Figs. 2 to 4, illustrating the manner of its application to the handle bar post and seat post of the bicycle frame which latter is shown in fragmentary sectional elevation, Fig. 6 is a plan view of the paperboard blank from which the cradle member for one of the wheels (the front wheel) of the bicycle is formed, Fig. 7 is a perspective view of the completed cradle member, Fig. 8 is a plan view of the paperboard blank from which the longitudinal stop member for the other wheel of the bicycle (the rear wheel) is formed, and Fig. 9 is a perspective view of the completed longitudinal stop member.

It will be noted that, in the interest of simplicity, no attempt has been made to illustrate the paperboard material from which the spacing and blocking members are formed as corrugated board. Moreover, it is not intended that the invention be limited to the formation of these members from such corrugated board, although its use for their formation is preferable, as hereinbefore indicated.

Having reference particularly to Fig. 1, it will be seen, as has already been explained, that the spacing and blocking members of the invention comprise a cradle member $a$ for one wheel $a'$ (preferably the front wheel) of the bicycle, a longitudinal stop member $b$ for the other wheel $b'$ (preferably the rear wheel) of the bicycle, and a frame engaging member $c$ for cooperation with the handle bar post $c'$ and seat post $c''$ of the bicycle frame. All of these members are of a width substantially equal to the internal width of the packaging container $d$ and when located therein in engagement with the designated parts of the bicycle with which they cooperate are incapable of lateral movement relatively to the container and hence prevent any similar movement of the packaged bicycle. Also, it will be apparent that the cradle member $a$ and frame engaging member c bear against the bottom and top walls of the container, respectively, and serve to prevent or block movement of the bicycle between such walls. The overall interior length of the container d with respect to the overall length of the packaged bicycle, and the design of the longitudinal stop member b, are such that when the said stop member b is properly applied, as shown, the front wheel of the bicycle will be held in engagement with one end wall of the container and its rear wheel will be spaced from the other end wall a distance sufficient to hold the fender or mud guard of the rear wheel out of possible contact with such other end wall.

Hence, with its front wheel supported by the cradle member a and bearing against the adjacent end wall of the container d, its rear wheel bearing against the bottom wall of the container and spaced from the adjacent other end wall by the longitudinal stop member b, and the upper portion of its frame held by the frame engaging member c bearing against the top wall of the container, and all of the spacing and blocking members a, b, and c having a close fit between the side walls of the container, it will be apparent that the packaged bicycle is incapable of shifting within the container either, longitudinally, vertically or laterally. Also, as has been mentioned, the form of the spacing and blocking members, and the inherent yieldable or springy nature of the paperboard material of which they are made, will provide for cushioning of the packaged bicycle against shocks incident to handling and shipment.

Referring more particularly to the form and construction of the various spacing and blocking members a, b and c, and their functional arrangement with respect to the designated parts of the bicycle with which they cooperate, attention is directed to Figs. 2 to 9.

The frame engaging member c shown in Figs. 2 to 5 is constructed from an elongated blank of paperboard material of a width substantially corresponding to the interior width of the packaging container d with which the member is to be associated and provided with a plurality of scores or fold lines 1, 2, 3, 4, 5, 6, 7 and 8 arranged transversely thereof. The body portion 9 of the blank lying between the fold lines 1 and 4 is of a length adequate to substantially span the distance between the handle bar post c' and seat post c'' of the bicycle to be packaged, and is provided adjacent to the first mentioned fold line 1 with cuts 10, 11 and 12, and a score or fold line 13, to define a bendable and foldable tongue 14. That part of the blank lying between the fold line 2 and the adjacent blank end comprises two sections 15 and 16, divided by the fold line 3, and flat foldable upon the said fold line 3 to provide a spacing pad and formed with registering perforations 17 through which the tongue 14 may be passed and retained in looped or folded back arrangement to provide a relatively rigid member for insertion into the handle bar post c' of the bicycle frame, as shown in Fig. 5, when the flat folded sections 15 and 16 are doubled upon the fold lines 1 and 2 beneath the main or body portion 9 of the blank and thus secured by staples 18 or other appropriate fastening means. Between the fold line 4 and the end of the blank adjacent thereto are five sections 19, 20, 21, 22 and 23, defined by the intermediate fold lines 8, 7, 6 and 5, and the three sections 20, 21 and 22 next adjacent to the end section 19 of the blank are provided with perforations or apertures 24 which, when the sections 19, 20, 21 and 22 are folded upon each other in zig-zag arrangement and against the under side of the body portion 9 of the blank, to form another pad portion, will register to form a recess or socket in such pad portion to receive the upwardly extending end of the seat post c'' of the bicycle frame, Fig. 5, the section 23 serving as an end for the member and accommodating the multiple thickness of the folded sections 19, 20, 21 and 22. Staples 25 or other appropriate fastening means are preferably employed to hold the parts in intimate flat-folded relation.

The cradle member a shown in Figs. 6 and 7 is formed from an elongated blank of a width also substantially corresponding to the interior width of the packaging container d provided adjacent to its ends with similarly spaced transverse score or fold lines 26, 27 and 28. The main portion of the blank lying between the fold lines 26 innermost from the ends constitutes a cradle base 29, and the other fold lines 27 and 28 define sections 30 and 31 provided with cut-outs or apertures 32 spanning the intermediate fold lines 27, and end sections 33 which, when the sections are folded to inverted V formation, or triangular form, as shown in Fig. 7, provide securing flaps which are preferably attached by staples 34 or the like fastening means to the underlying parts of the main portion or cradle base 29 of the blank to form a pair of similar cradle means. It will be noted that the apertures 32 are non-symmetrical, extending further into the portions 30 than into the portions 31 adjacent to the intermediate fold lines 27, and thus when the cradle member is set up as shown in Figs. 1 and 7 and applied to the bicycle wheel the ends of the apertures lying in these two portions 30 and 31 will intimately engage the wheel tire at four points (or lines) peripherally thereof and the cradle member will thus be held against displacement from the wheel in a direction normal to the axis thereof.

The longitudinal stop member b shown in Figs. 8 and 9 is formed from an elongated blank of a width similar to that of the blanks for the other members a and c and is provided with appropriately located spaced transverse scores or fold lines 35, 36, 37, 38 and 39. The portion 40 of the blank lying between the first of said fold lines 35 and the adjacent end of the blank constitutes a foot the free end 41 of which provides a supporting bearing for the member, and the other portions 42, 43, 44, 45 and 46 of the blank defined by the fold lines 35, 36, 37, 38 and 39 are adapted to be folded upon each other in succession, starting with the end portion 46, to produce a rigid triangular stop member offstanding from the foot portion 40 and secured thereto as by staples 47 passing through the foot portion and the folded portion 44 juxtaposed thereagainst. Those portions 42, 43, 45 and 46 of the blank which lie at the apex of the triangular formation are provided with cut-outs or apertures 48 and 49 spanning the respective fold lines 36 and 39 and registering when the blank is folded and set up as shown in Fig. 9 to provide means for embracing the bicycle wheel and spacing it from the adjacent end of the container as shown in Fig. 1, it being noted that the extent of the portions of the apertures 42—43 and 45—46 adjacent to the fold lines 36 and 39, respectively, is dissimilar to accommodate the triangular member to the periphery of the wheel tire in the position in which it is supported with relation thereto by the foot 40 when its free end 41 rests upon the bottom wall of the packaging container. Hence, due to engagement of the foot 40 with the bottom wall of the container and the tire engaging formation of the registering apertures 48—49, the longitudinal stop member will be incapable of shifting with respect to the wheel and container.

Various changes and modifications are considered to be within the principle of the invention and the scope of the following claims.

What I claim is:

1. In a bicycle package comprising a packaging container having top, bottom, end and side walls, spacing and blocking members for a bicycle enclosed by said container, said members including a cradle member interposed between one wheel of the bicycle and the bottom wall of the container, a frame engaging member interposed between frame parts of the bicycle and the top wall of the container, and a longitudinal stop member interposed between the other wheel of the bicycle and an end wall of the container, all of said spacing and blocking members having a close fit between the side walls of the container and in their cooperation with parts of the bicycle and other walls of the container and serving to prevent longitudinal, vertical and lateral shifting of the bicycle within the container, said cradle member including means arranged in offstanding relation to the bottom wall of the container and apertured to embrace one wheel of the bicycle to prevent lateral shifting thereof, said frame engaging member being formed of an integral strip scored for folding to multi-layered thickness adjacent to its ends and cut to provide at the multi-layered thickness adjacent to one end an integral offstanding tongue for insertion into the handle bar post of the bicycle frame, the multi-layered thickness at the other end being apertured throughout a portion of its layers to provide socket means for engagement with the seat post of the bicycle frame, and said longitudinal stop member including means offstanding from the end wall of the container and aperture to embrace and bear against the periphery of the other wheel of the bicycle and having a foot portion for abutting engagement with the bottom of the container to position said stop member in proper functional relation to said other wheel.

2. A spacing and blocking member for engagement with frame parts of a bicycle packaged in a container, comprising an elongated strip of bendable material of a width substantially commensurate with the internal width of the container and provided with transverse fold lines defining a body portion and sections extending from at least one end of said body portion and foldable to provide pad means adapted to overlie the handle bar post of the bicycle frame, said sections being perforated and their perforations registering to form an aperture upon folding of the sections, and cut and score means in said body portion defining an integral tongue bent to offstand from said body portion and passing through said aperture to extend into said handle bar post.

3. A spacing and blocking member as claimed in claim 2, in which said tongue is passed through said aperture and its free end is folded back and inserted in said aperture.

4. A spacing and blocking member for engagement with the handle bar post and seat post of a bicycle packaged in a container, comprising an elongated strip of bendable material of a width substantially commensurate with the internal width of the container and provided with transverse fold lines defining a body portion to span the space between said posts, and sections extending from the ends of said body portion and foldable to provide pad means adapted to overlie said handle bar post and seat post, respectively, the sections forming the pad means to overlie said handle bar post being perforated and their perforations registering upon folding of the sections to thereby form an aperture, cut and score means in said body portion defining an integral tongue bent to offstand from said body portion and passing through said aperture to extend into said handle bar post, and certain of the sections forming the pad means to overlie said seat post being perforated and their perforations registering when the sections are folded to thereby provide a socket for engagement with said seat post.

PAUL J. YARMAN.

REFERENCES CITED

The following references are of record in the file of this patent:

UNITED STATES PATENTS

| Number | Name | Date |
|---|---|---|
| 1,812,781 | Gibbs | June 30, 1931 |
| 2,238,166 | Gagen | Apr. 15, 1941 |
| 2,261,280 | Pennebaker et al. | Nov. 4, 1941 |
| 2,273,544 | Vandervort | Feb. 17, 1942 |
| 2,330,448 | Reaume | Sept. 28, 1943 |